US011962729B2

(12) United States Patent
Miki et al.

(10) Patent No.: US 11,962,729 B2
(45) Date of Patent: *Apr. 16, 2024

(54) INFORMATION PROCESSING APPARATUS AND NON-TRANSITORY COMPUTER READABLE MEDIUM THAT NOTIFIES OF PAPER REMAINING IN SLEEP STATE

(71) Applicant: FUJIFILM Business Innovation Corp., Tokyo (JP)

(72) Inventors: Masayoshi Miki, Kanagawa (JP); Teiju Sato, Kanagawa (JP); Masato Saito, Kanagawa (JP); Yasuhiro Nakatani, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 373 days.

This patent is subject to a terminal disclaimer.

(21) Appl. No.: 16/872,378

(22) Filed: May 12, 2020

(65) Prior Publication Data
US 2021/0120138 A1    Apr. 22, 2021

(30) Foreign Application Priority Data
Oct. 16, 2019   (JP) .................... 2019-189066

(51) Int. Cl.
*H04N 1/00* (2006.01)
*G06F 1/3206* (2019.01)
*G06F 3/12* (2006.01)

(52) U.S. Cl.
CPC ....... *H04N 1/00896* (2013.01); *G06F 1/3206* (2013.01); *H04N 1/0049* (2013.01); *H04N 1/00692* (2013.01); *H04N 1/00697* (2013.01)

(58) Field of Classification Search
CPC .... G06F 1/3206; G06F 1/3231; G06F 1/3284; G06F 1/3287; G06F 3/1221;
(Continued)

(56) References Cited

U.S. PATENT DOCUMENTS 9,098,797 B2    8/2015  Yamano
2007/0291998 A1*  12/2007  Takizawa ............ G07C 9/37
                                                                  382/118
(Continued)

FOREIGN PATENT DOCUMENTS

JP    H0545471    2/1993
JP    H06102733   4/1994
(Continued)

OTHER PUBLICATIONS

"Notice of Reasons for Refusal of Japan Counterpart Application", dated May 16, 2023, with English translation thereof, p. 1-p. 6.

*Primary Examiner* — Chad Dickerson
(74) *Attorney, Agent, or Firm* — JCIPRNET

(57) ABSTRACT

An image forming apparatus includes a mounting surface provided on a main body and on which paper is placed; a person detection section provided in the main body; a processor configured to control return from a sleep state of the main body, based on the detection of a person by the person detection section, and perform control such that in a case where there is no paper on the mounting surface when transition to the sleep state, a nearby person approaching the main body is included in a detection target of the person detection section, and a passerby passing near the main body is not included in the detection target, in the sleep state, and in a case where there is a paper on the mounting surface when the transition, the nearby person and the passerby are included in the detection target, in the sleep state; and a notification section that notifies of paper remaining in a case where there is a paper on the mounting surface after the return.

14 Claims, 16 Drawing Sheets

(58) Field of Classification Search
CPC ............... G06F 3/1229; H04N 1/0049; H04N 1/00692; H04N 1/00697; H04N 1/00896; Y02D 10/00; Y02D 30/50
USPC ................................................ 358/1.11–1.18
See application file for complete search history.

(56) References Cited

U.S. PATENT DOCUMENTS

| | | | |
|---|---|---|---|
| 2015/0103365 A1* | 4/2015 | Baba | H04N 1/00323 358/1.13 |
| 2019/0042839 A1* | 2/2019 | Tomi | G06V 40/23 |
| 2021/0116850 A1* | 4/2021 | Miki | G03G 15/607 |
| 2021/0227088 A1* | 7/2021 | Watanabe | H04N 1/00352 |

FOREIGN PATENT DOCUMENTS

| | | | |
|---|---|---|---|
| JP | 2002071833 | | 3/2002 |
| JP | 2013033050 | | 2/2013 |
| JP | 2015000501 | | 1/2015 |
| JP | 2016171386 | | 9/2016 |
| JP | 2016171386 A | * | 9/2016 |
| JP | 2017118255 | | 6/2017 |
| JP | 2019018422 | | 2/2019 |
| JP | 2019018422 A | * | 2/2019 |

* cited by examiner

FIG. 16

| UPPER PAPER SENSOR 30 | LOWER PAPER SENSOR 32 | LIGHT EMISSION MODE 106 | | | | |
|---|---|---|---|---|---|---|
| | | A | B | C | D | E |
| ABSENCE | ABSENCE | – | – | – | – | – |
| PRESENCE | ABSENCE | LIGHTING | BLINKING (LONG CYCLE) | GREEN LIGHTING | – | LIGHTING |
| ABSENCE | PRESENCE | LIGHTING | BLINKING (SHORT CYCLE) | YELLOW LIGHTING | LIGHTING | – |
| PRESENCE | PRESENCE | LIGHTING | LIGHTING | WHITE LIGHTING | LIGHTING | LIGHTING |

INFORMATION PROCESSING APPARATUS AND NON-TRANSITORY COMPUTER READABLE MEDIUM THAT NOTIFIES OF PAPER REMAINING IN SLEEP STATE

CROSS-REFERENCE TO RELATED APPLICATIONS

This application is based on and claims priority under 35 USC 119 from Japanese Patent Application No. 2019-189066 filed Oct. 16, 2019.

BACKGROUND (i) Technical Field

The present invention relates to an image forming apparatus and a non-transitory computer readable medium storing a program.

(ii) Related Art

There is known an image forming apparatus provided with a light emitter that supports handling of an image-formed paper or the like. By the light emitter being turned on, the user is notified of the discharge of the paper and the presence of the discharged paper. Alternatively, by the light emitter being turned on, the discharged paper and surroundings are illuminated. For example, in a case where a paper sensor is embedded in a mounting surface such as a discharge tray and the paper sensor detects a paper, the light emitter is turned on. However, in a case where the image forming apparatus transitions to the sleep state for power saving, the light emitter is turned off.

On the other hand, an image forming apparatus including a human sensor has been known (for example, see JP2013-033050A). In such an image forming apparatus, in the sleep state, a user approaching the main body of the image forming apparatus is detected by the human sensor, and the image forming apparatus automatically returns from the sleep state to an operable state by using this as a trigger. Thereby, user convenience is enhanced. However, those who simply pass near the main body of the image forming apparatus are excluded from detection targets. This is to avoid excessive or useless return.

In the sleep state, power is not normally supplied to the above-described paper sensor or light emitter. In a case where there is a nearby person in this state, the image forming apparatus returns from the sleep state, and at that time, supply of power to the paper sensor and the light emitter is restarted. At this time, in a case where a paper still remains on the mounting surface, the light emitter is turned on to notify of the paper remaining. JP2017-118255A discloses an image forming apparatus that notifies the user that removal of a document is forgotten, when returning from a power saving mode.

SUMMARY

In an image forming apparatus that is automatically returned in a case where a person is detected in the sleep state, from the viewpoint of enhancing the convenience of a person who actually uses the apparatus, among a nearby person approaching the main body and a passerby passing near the main body, only the nearby person is a detection target in the sleep state. That is, the passerby is excluded from the detection targets that cause the return. However, in a case where paper remains on the mounting surface such as the discharge tray, for example, it is preferable to notify more persons of the paper remaining after returning from the sleep state, that is, to notify not only a nearby person but also a passerby of the paper remaining.

Aspects of non-limiting embodiments of the present disclosure relate to an image forming apparatus and a non-transitory computer readable medium storing a program, which notify a passerby of a paper in a case where there is the passerby in the sleep state.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including a mounting surface provided on a main body and on which paper is placed; a person detection section provided in the main body; a processor configured to control return from a sleep state of the main body, based on the detection of a person by the person detection section, and perform control such that in a case where there is no paper on the mounting surface when transition to the sleep state, a nearby person approaching the main body is included in a detection target of the person detection section, and a passerby passing near the main body is not included in the detection target, in the sleep state, and in a case where there is a paper on the mounting surface when the transition, the nearby person and the passerby are included in the detection target, in the sleep state; and a notification section that notifies of paper remaining in a case where there is a paper on the mounting surface after the return.

BRIEF DESCRIPTION OF THE DRAWINGS

Exemplary embodiment(s) of the present invention will be described in detail based on the following figures, wherein:

FIG. 16 is a diagram for explaining a plurality of light emission modes.

DETAILED DESCRIPTION

Figure 1:
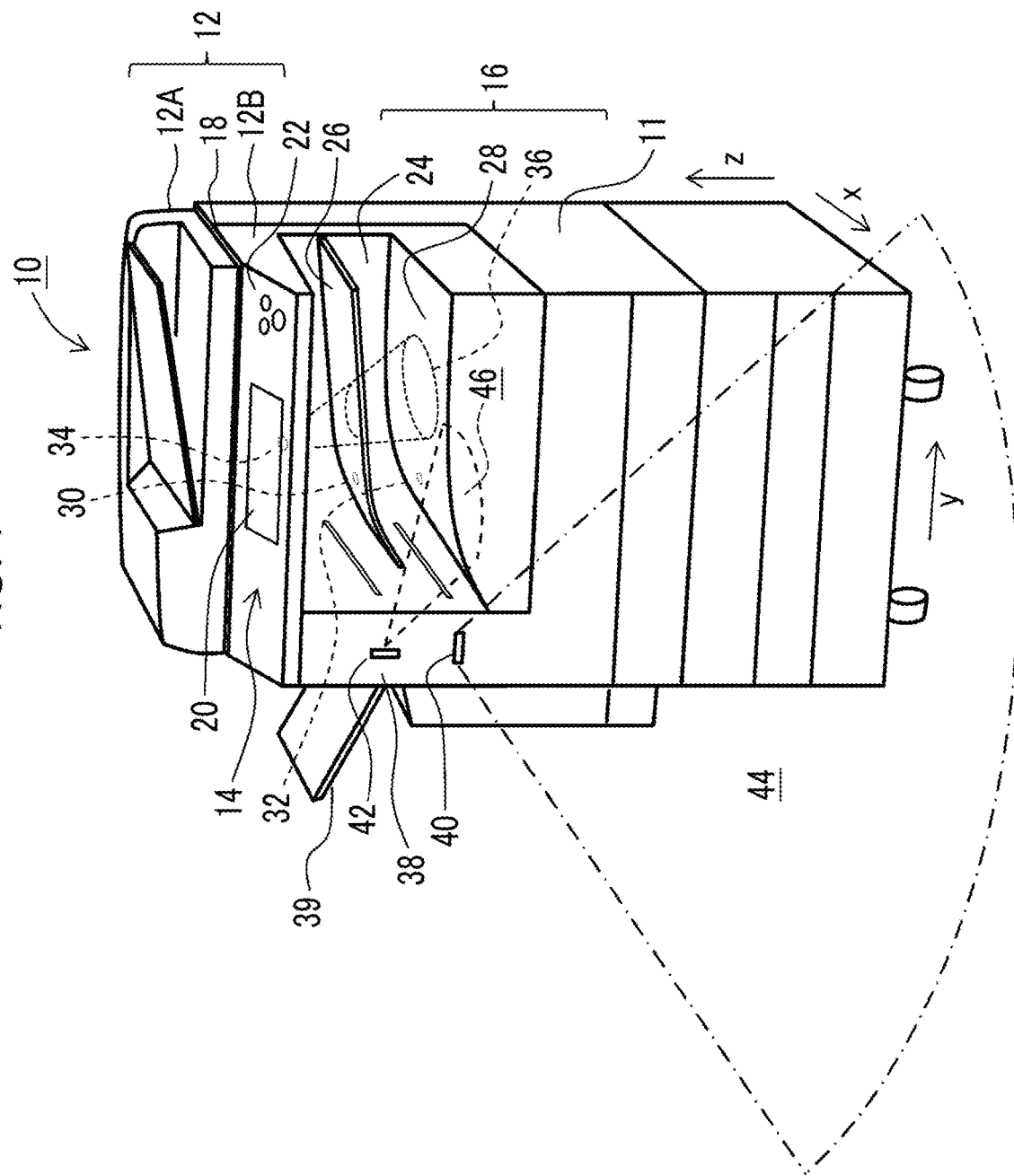
FIG. 1 is a perspective view illustrating a configuration example of an image forming apparatus according to an exemplary embodiment.

Hereinafter, exemplary embodiments will be described with reference to the drawings.

(1) Overview of Exemplary Embodiment

An image forming apparatus according to an exemplary embodiment has amounting surface, a person detection section, a processor, and a notification section. The mounting surface is a surface provided in the main body and on which a paper as a notification object is placed. The person detection section is provided in the main body, and detects a person for return. The processor controls the return of the main body from the sleep state based on the detection of the person by the person detection section, and corresponds to the control section. Here, the detection of a person is not merely a detection of a person but a detection of a person as an event that causes a return. In other words, in a case where there is no paper on the mounting surface when transition to the sleep state (that is, in the case of "transition without paper"), the processor performs control such that nearby persons approaching the main body are included and passersby passing near the main body are not included in the detection target, in the sleep state. In addition, in a case where there is a paper on the mounting surface when the transition (that is, in the case of "transition with paper"), the processor performs control such that nearby persons and passersby passing are included in the detection target in the sleep state. The notification section notifies of paper remaining in a case where there is a paper on the mounting surface after the return.

As described above, in the case of the transition with the paper, a return condition is determined such that the passerby as well as the nearby person is notified of the paper remaining, and the return control is executed according to the condition. Thus, after returning, the passerby as well as the nearby person are notified of the paper remaining. For example, in the night, in a case where a paper is discharged on the mounting surface by facsimile reception, when a person who has come to work in the morning passes near the main body of the image forming apparatus, the image forming apparatus automatically returns to notify of the paper remaining. The necessary paperwork for the paper can be prompted.

In the image forming apparatus according to the exemplary embodiment, the concept of the mounting surface includes a surface on which a image-formed paper is placed, and a surface on which the image-read paper is placed. Examples of the mounting surface include a discharge tray inside the main body, a discharge tray outside the main body, a document tray, a platen, or the like. The paper on the mounting surface may be directly detected by a paper sensor or the like, or the paper on the mounting surface may be indirectly detected by a sensor or the like that specifies the operation or posture of a member that covers or surrounds the mounting surface. The main body is a part including a mounting surface and a person detection section, which is generally considered as a part accessed by a user or a main part of an image forming apparatus, and includes, for example, an image forming unit and/or an image reading unit. The person detection section is a subsystem that detects a nearby person and a passerby, and may include one or a plurality of sensors, a signal processing circuit, a determination section, or the like. The concept of a processor includes various types of hardware, devices, circuits or equipment that perform data process, as described in more detail below.

The above-described nearby person and passerby are relative concepts that are distinguished in terms of sensing, signal processing, or determination. For example, in a case where the moving direction of the body is used as a criterion, a person approaching the main body is a nearby person, and a person passing near the main body but moving in a different direction from the main body is a passerby. In a case where the distance between the main body and the body is used as a criterion, a person who has come closer to the main body is a nearby person, and a person who has approached the main body to some extent but does not approach the main body is a passerby. The moving speed, the moving path, the body direction, or the like may be used as the criterion. A plurality of criteria may be used in combination.

For example, a person or the range of the detection target is switched by switching the detection range, switching the signal processing condition, or switching the determination condition. From another point of view, it may be understood that the person detected in the sleep state in the case of the transition without paper is a nearby person, and the person detected in the sleep state in the case of the transition with paper is a nearby person and a passerby. Regarding person detection, a passerby and a nearby person may be distinguished, or a passerby and a nearby person may have a partially overlapping relationship. In any case, the person detection condition is set as the return condition such that in the case of transition without paper, priority is given to avoidance of unnecessary return and power saving while in the case of transition with paper, more people are notified of the paper remaining than in the transition without paper.

The sleep state is a state in which power consumption is reduced as compared with the state before the sleep state and the state after the return, and typically, a state where some functions required for return (for example, a person detection section and a return control part) are operating. Typically, in the sleep state, all or a part of the person detection sections are functioning, so that the person detection section is ready to detect a human. In general, return is also one mode of the transition, but in the present specification, for simplicity of description, the transition from the operating state to the sleep state is referred to as "transition", and the transition from the sleep state to the operating state is referred to as "return".

In the exemplary embodiment, in the case of the transition without paper, in the sleep state, the detection range of the person detection section is set to a limited detection range for including a nearby person as a detection target and excluding a passerby from the detection target. On the other hand, in the case of the transition with paper, in the sleep state, the detection range of the person detection section is set to an enlarged detection range for including a nearby person and a passerby as detection targets. The enlarged detection range is a range spatially larger than the limited detection range.

In the above configuration, the detection target of the person detection section is changed by switching or changing the detection range. The person detection section detects an object using light (including infrared rays), ultrasonic waves, radio waves, and the like. As a sensor for that purpose, any of an active sensor and a passive sensor can be used. The detection range can be changed by various methods, for example, by switching the sensor, changing the transmission power, changing the reception gain, changing the comparison threshold, or the like. The limited detection range is a relatively small range, and the enlarged detection range is a relatively large range. In a case of comparing the sizes of the two detection ranges, the volume sizes of the two detection ranges in the three-dimensional space may be compared, or the sizes of the two projected images in a case where the two detection ranges are projected on a horizontal plane may be compared.

A person detection section including a limited human sensor having a limited detection range and an enlarged human sensor having an enlarged detection range may be employed. In a case where this configuration is adopted, in the case of the transition without paper, in the sleep state, a person is detected based on the output of the limited human sensor. On the other hand, in the case of the transition with paper, in the sleep state, a person is detected based on the output of the enlarged human sensor. In this configuration, a detection target is changed by switching a sensor or selecting a sensor output.

A person detection section including a primary human sensor and a secondary human sensor activated based on the output of the primary human sensor may be employed. In a case where this configuration is adopted, in the case of the transition without paper, in the sleep state, the detection range of the secondary human sensor is set to the limited detection range. On the other hand, in the case of the transition with paper, in the sleep state, the detection range of the secondary human sensor is set to the enlarged detection range. This configuration changes the detection target by changing at least the detection range of the secondary human sensor on the assumption of the combination of the primary human sensor and the secondary human sensor activated by the output of the primary human sensor.

In the case of the transition without paper, in the sleep state, the detection range of the primary human sensor may be set to the first primary detection range. On the other hand, in the transition with paper, in the sleep state, the detection range of the primary human sensor may be set to the second primary detection range larger than the first primary detection range. This configuration changes the detection range of the primary human sensor in combination with the change in the detection range of the secondary human sensor. In the case of the transition with paper, more people correspond to passersby.

In the case of the transition without paper, in the sleep state, when the output signal of the human sensor satisfies the first determination condition for including the nearby person and excluding the passerby from the detection target, the return may be executed. On the other hand, in the case of the transition with paper, in the sleep state, when the output signal of the human sensor satisfies the second determination condition for including the nearby person and the passerby in the detection target, the return may be executed. Here, the second determination condition is a condition that is more easily satisfied than the first determination condition.

The above configuration changes the detection target by changing or switching the determination condition. The first determination condition and the second determination condition are relative concepts, and the second determination condition is a condition that is more easily satisfied, that is, less strict than the first determination condition. For example, the determination condition is more easily satisfied by lowering the determination threshold. Examples of the threshold include a detection cycle threshold, a detection count threshold, and the like.

For example, both the first determination condition and the second determination condition require that a predetermined number i of person detection values are continuously output as an output signal of the human sensor. By applying the first determination condition, the sampling cycle of the output signal is set to the first period, and by applying the second determination condition, the sampling cycle of the output signal is set to the second period shorter than the first period. In a case where the sampling cycle is shortened, person detection values per unit time can be obtained more easily. In this case, a person can be detected more easily than when the sampling cycle is long. i is an integer of 2 or more.

For example, the first determination condition requires that j person detection values are output continuously as an output signal of the human sensor, and the second determination condition requires that k person detection values smaller than j are output continuously as an output signal of the human sensor. In a case of reducing the thresholds (specifically, j, k) to be compared with the continuous number of person detection values, a person is detected with a smaller continuous number. Since k is smaller than j, the detection target is expanded in the case of the transition with paper than in the case of the transition without paper. j is an integer of 2 or more, and k is an integer of 1 or more. There is a relationship j>k.

However, a plurality of modes, such as a mode for giving priority to the notification of the paper remaining and a mode for giving priority to power saving, may be prepared for the return, and the user may select any one of the modes.

In the exemplary embodiment, the mounting surface is a discharge tray provided in a cavity of the main body. The notification section includes a light emitter that emits light toward the discharge tray. In a case where there is a paper on the discharge tray in the cavity, the paper and surroundings tend to be dark, and the range in which the paper can be viewed is likely to be limited. That is, a situation where a paper is hard to notice occurs. By irradiating such a discharge tray with light, it is easy to remove the paper, and it is easy to notice the presence of paper.

In an exemplary embodiment, a plurality of discharge trays are provided in the cavity. The light emitter emits light toward a plurality of discharge trays. In a case where there is a paper on at least one of the plurality of discharge trays when the transition, in the sleep state, a nearby person and a passerby are included in the detection target. Common use of light emitters generally results in a reduction in the number of component.

The notification section may switch a light emission mode according to a paper remaining mode in the plurality of discharge trays. This is to notify the paper remaining mode by the light emission mode. The concept of switching the light emission mode includes a change in luminance, a change in hue, and a switching of lighting pattern, or the like, as will be described later in a specific example.

In an exemplary embodiment, a plurality of discharge trays are provided in the cavity. The light emitter emits light toward a plurality of discharge trays. In a case where there is a paper on the discharge tray designated from among the plurality of discharge trays when the transition, in the sleep state, a nearby person and a passerby may be included in the detection target. This configuration gives priority to the notification of the remaining paper on a specific discharge tray. A discharge tray on which papers requiring earlier paperwork or more important papers are placed may be designated.

The image forming apparatus according to the exemplary embodiment includes a person detection unit, a first control unit, a second control unit, a third control unit, and a notification unit. The first control unit performs control such that in a case where there is no paper on the mounting surface when transition to the sleep state (that is, in the case of "transition without paper"), nearby persons approaching the main body are included and passersby passing near the main body are not included in the detection target of the person detection unit, in the sleep state. The second control unit performs control such that in a case where there is a paper on the mounting surface when the transition (that is, in the case of "transition with paper"), in the sleep state, the processor performs control such that nearby persons and passersby passing are included in the detection target. The third control unit controls the return from the sleep state in a case where a person is detected in the sleep state. The notification unit notifies of paper remaining in a case where there is a paper on the mounting surface after the return.

The method according to the exemplary embodiment includes a first control step, a second control step, a third control step, and a notification step. The first control step is a step of performing control such that in a case where there is no paper on the mounting surface when transition to the sleep state (that is, in the case of "transition without paper"), nearby persons approaching the main body are included and passersby passing near the main body are not included in the detection target of the person detection section, in the sleep state. The second control step is a step of performing control such that in a case where there is a paper on the mounting surface when the transition (that is, in the case of "transition with paper"), in the sleep state, the processor performs control such that nearby persons and passersby passing are included in the detection target. The third control step is a step of controlling the return from the sleep state in a case where a person is detected person detection section, in the sleep state. The notification step is a step of notifying of paper remaining in a case where there is a paper on the mounting surface after the return.

The above method is implemented as a hardware function or a software function. In the latter case, a program for executing the above method is installed in the information processing apparatus via a portable storage medium or via a network. The concept of the information processing apparatus includes various apparatuses having an image forming function.

(2) Details of Exemplary Embodiment

FIG. 1 illustrates a configuration example of an image forming apparatus according to an exemplary embodiment. The illustrated image forming apparatus 10 is a multifunctional apparatus having a print function, a scanner function, a copy function, a facsimile function, and the like. Each technique described below may be incorporated into an image forming apparatus having some of these functions or an apparatus having other functions.

The image forming apparatus 10 has a plurality of operation modes. Specifically, the operation mode includes a limited notification mode that limits the persons who are notified of the paper remaining when returning from the sleep state, and an enlarged notification mode that widens the persons who are notified of the paper remaining when returning.

In a situation where the limited notification mode is selected, regardless of whether or not the paper remains on the predetermined mounting surface when transition to the sleep state, that is, regardless of "transition without paper" or "transition with paper", in the sleep state, among a nearby person approaching the image forming apparatus 10 and a passerby passing near the image forming apparatus 10, only the nearby person is a detection target that causes a return. Only in a case where a nearby person is detected, the image forming apparatus 10 returns from the sleep state to the operating state. At this time, in a case where there is a paper on the predetermined mounting surface, the nearby person is notified of the paper remaining.

In a situation where the enlarged notification mode is selected, in a case where no paper remains on the predetermined mounting surface when the transition to the sleep state, that is, in a case of the transition without paper, the same operation as the operation in the case where the above-described limited notification mode is selected is performed. That is, in the sleep state, only a nearby person is a detection target, and the image forming apparatus returns only in a case where there is a nearby person. In a situation where the enlarged notification mode is selected, in a case where a paper remains on the predetermined mounting surface when transition to the sleep state, that is, in a case of the transition with paper, in the sleep state, both a nearby person and a passerby are detection targets, and in a case where one of the nearby person and the passerby is detected, the image forming apparatus returns from the sleep state. At the time of return, in a case where there is a paper on the predetermined mounting surface, not only the nearby person but also the passerby are notified of the paper remaining.

Hereinafter, the configuration and operation of the image forming apparatus 10 will be described on the assumption that the enlarged notification mode is selected. Note that various examples are considered for detecting a person in the sleep state. Among a first example to a fifth example to be described later, the contents of FIG. 1 illustrates the first examples. In FIG. 1, an x direction is a first horizontal direction as a depth direction or a front-back direction, a y direction is a second horizontal direction as a left-right direction, and a z direction is a vertical direction as a up-down direction. These three directions are orthogonal to each other.

In FIG. 1, the image forming apparatus 10 includes a plurality of units that are functionally and physically separated. Specifically, the image forming apparatus 10 has a main body 11 which forms a main part or is a basic part. The main body 11 has generally a box-shape as a whole, and in the illustrated configuration example, the main body 11 includes an image reading unit 12, a user interface (UI) unit 14, an image forming unit 16, or the like. A control unit, a sensor substrate, or the like are also provided in the main body 11, but are not illustrated in FIG. 1.

In the illustrated configuration example, the image reading unit 12 includes an upper reading unit 12A and a lower reading unit 12B. The upper reading unit 12A includes an automatic document feeder or an automatic document reading device that reads an image from each document while sequentially transmitting a plurality of documents. The upper reading unit 12A has a document tray on which a document to be read is set and a discharge tray for discharging the document after reading. Each of these trays is provided with a paper sensor for determining the presence or absence of paper, but the paper sensor is not illustrated in FIG. 1. The upper reading unit 12A performs an opening and closing motion using a hinge portion provided on the back side of the main body 11 as a rotation axis. An open and close sensor (not illustrated) is provided at the hinge portion.

The lower reading unit 12B reads an image from a document placed on the platen 18. In a case where a document is placed on the platen 18, the entire platen 18 is covered by the upper reading unit 12A. At this time, the upper reading unit 12A functions as a document cover. In a case where the document remains on the platen 18 after reading the image, it is possible to determine the remaining from the output signal of the open and close sensor. It may be determined whether or not the document remains by irradiating the document with light from the inside of the platen 18.

The UI unit 14 includes a touch screen panel 20. The touch screen panel 20 includes a display device and an input device. A removable touch screen panel 20 may be employed. In that case, a so-called tablet terminal may be used as the touch screen panel 20. The display device is, for example, an LCD, which has a backlight. The button group 22 includes a power button, a power saving button, or the like. In a case where the power saving button is operated, the state transitions to the sleep state. The transition to the sleep state may be caused by another event such as a timeout. In the sleep state, in a case where a return event occurs, the image forming apparatus returns to the returns from the sleep state to the operating state. The return event includes the operation of the power saving button and the reception of the print job, and further includes the detection of a person described in detail below.

The image forming unit 16 is a unit that forms an image on a paper according to an electrophotographic method, and includes a transfer unit, a fixing unit, and the like. A plurality of paper feed trays are provided below the image forming unit 16.

In the main body 11, a horizontal groove-shaped cavity 24 is formed between the image forming unit 16 and the lower reading unit 12B. One surface in the x direction and one surface in the y direction of the cavity 24 are open surfaces. In the illustrated configuration example, an upper discharge tray 26 and a lower discharge tray 28 are provided in the cavity 24. The paper discharged after image formation is placed on the trays. Only one of the upper discharge tray 26 and the lower discharge tray 28, for example, the latter may be provided. Note that some of the trays (including the discharge trays 26 and 28) and the platen 18, which have already been described, are paper mounting surfaces.

A paper sensor 30 is provided in the upper discharge tray 26, and the presence or absence of a paper on the upper discharge tray 26 is determined based on the level of the output signal. The lower discharge tray 28 is provided with a paper sensor 32, and the presence or absence of a paper on the lower discharge tray 28 is determined based on the level of the output signal. The paper sensors 30 and 32 are configured with, for example, an optical sensor, a micro switch, or the like.

In the exemplary embodiment, the two paper sensors 30 and 32 constitute a part of the image forming unit 16. That is, a part of the power supplied to the image forming unit 16 is supplied to the two paper sensors 30 and 32. In the sleep state, in a case where the power supply to the image forming unit 16 is stopped, the power supply to the two paper sensors 30 and 32 is also stopped, and the paper sensors stop operating. At the time of returning from the sleep state, the power supply to the image forming unit 16 is restarted. At that time, the power supply to the two paper sensors 30 and 32 is also restarted.

In the main body 11, a light emitter 34 is provided on the ceiling surface of the cavity 24. For example, in a case where a paper is present in one of the two discharge trays 26 and 28, in other words, in a case where the paper sensors 30 and 32 are operating and at least one of the paper sensors 30 and 32 detects the paper, the light emitter 34 is turned on. Thus, the light beam 36 is emitted from the light emitter 34 toward the two discharge trays 26 and 28. For example, the light emitter 34 is configured by an LED. The upper discharge tray 26 is formed of a transparent member, which transmits the light beam 36. Alternatively, the light beam 36 is formed so as to straddle the two discharge trays 26 and 28.

When the light beam 36 is applied, the inside of the cavity 24 becomes bright, and the visibility of the paper is improved. Further, the generation of the light beam 36 makes it possible to recognize the presence of the paper in the cavity 24. For example, the light emitter 34 starts a blinking operation from the start of discharging the paper, and maintains lighting for a certain period of time after the discharging of the paper is completed. Of course, this operation mode is only an example. Note that a plurality of light emitters can be provided inside or around the cavity 24. A light emitter may be provided for each discharge tray, and notification and illumination may be individually performed for each discharge tray.

In the main body 11, a pillar portion 38 as a wall portion is provided at a position adjacent to the cavity 24. On the side surface of the pillar portion 38 facing the cavity 24, two paper discharge slits are formed vertically side by side. In the illustrated configuration example, a first human sensor 40 and a second human sensor 42 are built in the pillar portion 38. Actually, a sensor substrate including the first human sensor 40 and the second human sensor 42 is disposed inside the pillar portion 38, and two openings for transmitting light are formed on the front surface of the pillar portion 38.

The first human sensor 40 is, for example, a pyroelectric sensor as an object sensor. The first human sensor 40 is a passive sensor that detects a moving object. In the example illustrated in FIG. 1, the detection range 44 of the first human sensor 40 is greatly extended to the front side of the main body 11.

The second human sensor 42 is, for example, a reflection sensor as an object sensor. The second human sensor 42 includes a light emitter and a light receiver and is an active sensor. In the example illustrated in FIG. 1, the detection range 46 of the second human sensor is limited to a local range on the front side of the main body 11.

In the first example, as described later, the main sensor for performing person detection is switched between the transition without paper and the transition with paper. In the case of the transition without paper, the second human sensor 42 becomes the main sensor. In this case, the first human sensor 40 is a sub-sensor that operates auxiliary to activate the second human sensor 42. From such a viewpoint, the first human sensor 40 is a primary human sensor, and the second human sensor 42 is a secondary human sensor. In the case of the transition with paper, the first human sensor 40 is the main sensor. In that case, the second human sensor 42 does not function in returning.

From another point of view, in the first example, in the case of the transition without paper, the detection range 46 as the limited detection range becomes the main detection range, and a person entering the detection range is a detection target. In this case, the detection range 44 is a sub-detection range that functions as an auxiliary. In the case of the transition with paper, the detection range 44 as the enlarged detection range is the main detection range. In that case, the detection range 46 does not function in returning. The operations of the first human sensor 40 and the second human sensor 42 according to the first example will be described later in detail with reference to FIGS. 3 and 4.

Note that the side tray 39 is a discharge tray provided outside the main body 11. Still another discharge tray may be provided. A finisher or the like may be provided at a position adjacent to the main body 11.

Figure 2:
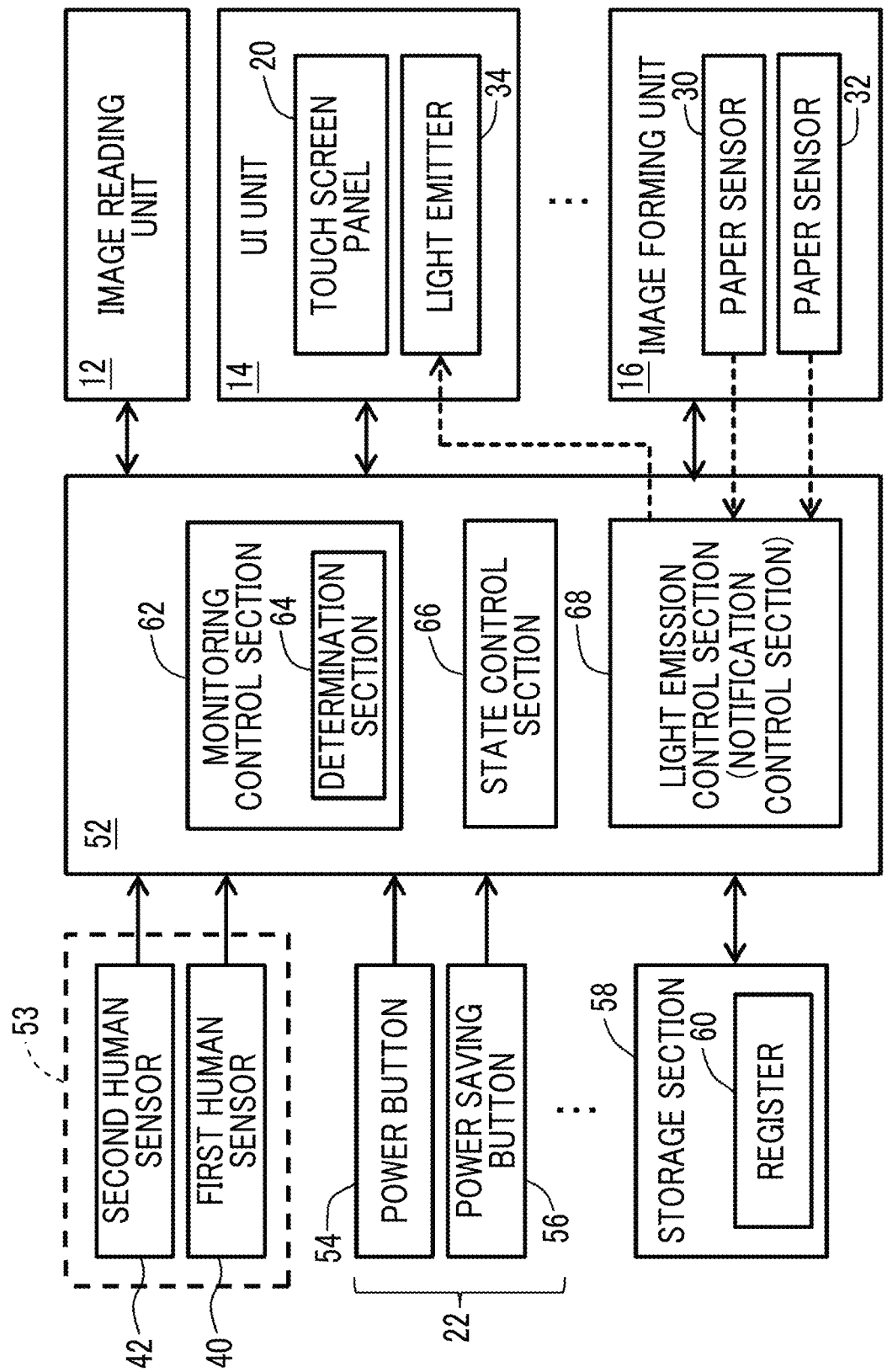
FIG. 2 is a block diagram illustrating an image forming apparatus according to the exemplary embodiment.

FIG. 2 is a block diagram of the image forming apparatus illustrated in FIG. 1. A processor 52 processes information, and corresponds to a control section, which constitutes a main part of the control unit. The control unit also includes a storage section 58. A part of the storage section 58 functions as a register 60 described later. The program executed by the processor 52 can be stored in the storage section 58.

Specifically, the processor 52 has a plurality of functions, of which main functions are represented by a plurality of blocks in FIG. 2. Specifically, FIG. 2 illustrates a monitoring control section 62, a state control section 66, and a light emission control section 68. The light emission control section 68 functions as a notification control section.

The processor 52 controls operations of the image reading unit 12, the UI unit 14, the image forming unit 16, or the like. The processor 52 controls power supply to a plurality of units by controlling a power supply destination selection unit (not illustrated). Actually, the power supply is controlled by the state control section 66. In a normal operating state, power is supplied to the image reading unit 12, the UI unit 14, the image forming unit 16, or the like. However, in order to save power, power supply to some units that are not used or are not scheduled to be used may be stopped. In the sleep state, power supply to a plurality of units connected to the processor 52 is stopped. In the sleep state, the processor 52 continues to supply power to the parts necessary for the return control. Further, even in the sleep state, a part related to the detection of a person in the image forming apparatus operates.

The UI unit 14 includes a touch screen panel 20 and a light emitter 34. In the sleep state, power is not supplied to the UI unit 14. That is, the light emitter 34 does not operate. The image forming unit 16 has two paper sensors 30 and 32. In the sleep state, power is not supplied to the image forming unit 16, that is, power is not supplied to the two paper sensors 30 and 32.

Output signals of the first human sensor 40 and the second human sensor 42 are input to the processor 52. The first human sensor 40 and the second human sensor 42 are placed on a sensor substrate 53. A circuit that processes each output signal is placed on the sensor substrate 53. The monitoring control section 62 in the processor 52 monitors the detection of a person in the sleep state, and generates a return trigger in a case where a person is detected. That is, the monitoring control section 62 instructs the state control section 66 to return. More specifically, the monitoring control section 62 includes a determination section 64. In the first example, the determination section 64 determines that a passerby and a nearby person have been detected, based on the output signal of the first human sensor 40, and determines that a nearby person has been detected, based on the output signal of the second human sensor 42.

The detection of a person may be determined in the signal processing circuit provided on the sensor substrate 53. For example, the signal processing circuit may determine that a nearby person or a passerby person has been detected by comparing the output signal of the first human sensor 40 with the first threshold, or may determine that a nearby person has been detected by comparing the output signal of the second human sensor 42 with the second threshold.

In the first example, the first human sensor 40, the second human sensor 42, the signal processing circuit, and the determination section 64 correspond to a person detection section. This also applies to a second example to a fifth example to be described later. However, in the case where the signal processing circuit employs a configuration capable of determining the detection of a predetermined person, the first human sensor 40, the second human sensor 42, and the signal processing circuit correspond to a person detection section. In a case where the human sensor can determine the detection of a predetermined person, the human sensor corresponds to the person detection section.

The button group 22 is connected to the processor 52. The button group 22 includes a power button 54 and a power saving button 56. In a case where the power saving button 56 is operated in the normal operating state, control for transition to the sleep state is executed. Subsequently, in a case where the power saving button is operated in the sleep state, control for returning to the operating state is executed. However, in the exemplary embodiment, as described in detail below, in the sleep state, in a case where a certain person is detected, control for returning to the operating state is automatically executed.

As already described, a part of the storage section 58 functions as the register 60. When transition to the sleep state, in a case where neither of the paper sensors 30 and 32 detects a paper, 0 is set in the register 60 as a flag indicating that there is no paper. On the other hand, when transition to the sleep state, in a case where one of the paper sensors 30 and 32 detects paper, 1 is set in the register 60 as a flag indicating that there is a paper. Note that the data (including the flag) stored in the storage section 58 is retained even in the sleep state.

In a normal operating state, in a case where one of the paper sensors 30 and 32 detects a paper, the light emission control section 68 controls the light emitter 34 to be turned on (see a broken line with an arrow in FIG. 2). Thus, the light beam is emitted toward the two discharge trays in the cavity. In a case where at least one of the paper sensors 30 and 32 detects a paper at the time of return, the light emission control section 68 turns on the light emitter. Thus, the user is notified of the paper remaining.

Figure 3:
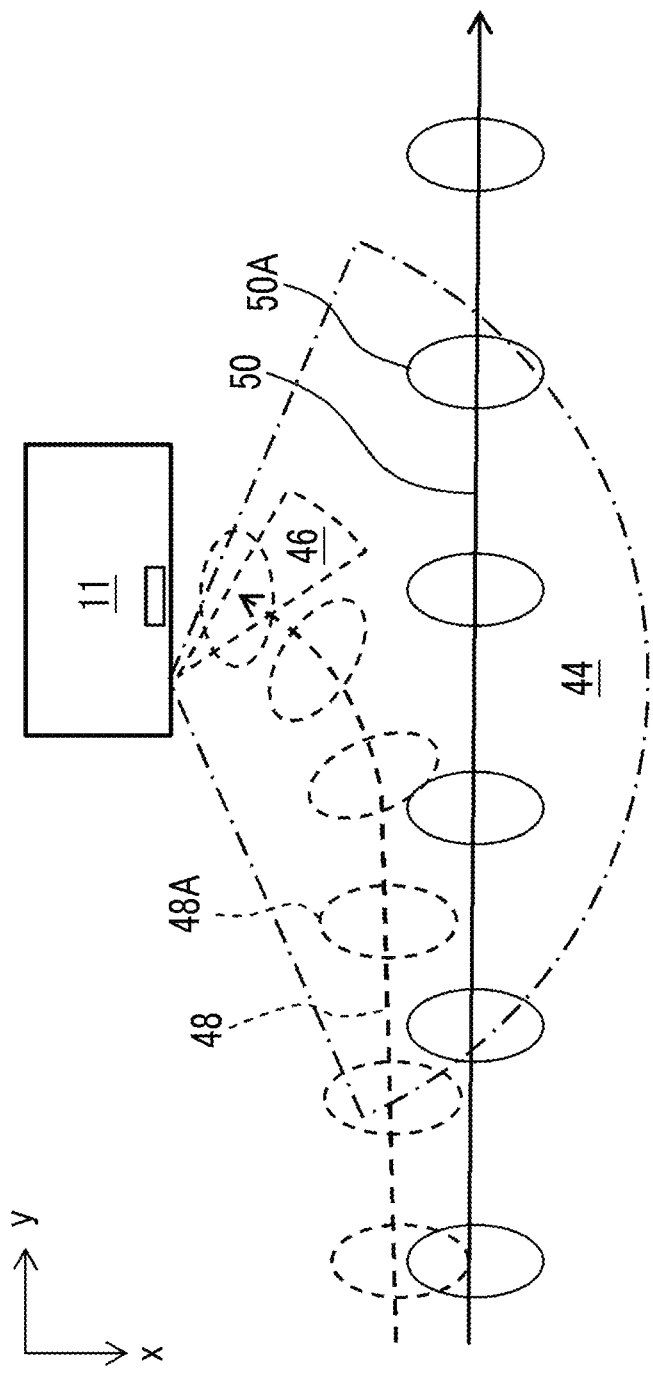
FIG. 3 is a schematic diagram for explaining detection of a nearby person and a passerby.

FIG. 3 illustrates a detection range 44 of the first human sensor and a detection range 46 of the second human sensor in the first example. FIG. 3 is a view of the main body 11 as viewed from above. In the illustrated example, the detection range 44 has a fan shape that extends horizontally. More specifically, the detection range 44 covers the front side (the positive side in the x direction) of the main body 11 widely and far, and extends to both sides of the y direction.

The detection range 46 locally and limitedly extends to the front side of the center of the main body 11, in other words, to the vicinity of the operation panel. The detection range 46 also generally has a fan shape, but the spread angle is considerably small, and the central axis is inclined with respect to the x and y directions. The detection range 46 is included in the detection range 44, but it is exemplary.

The detection range 44 has a larger size than the detection range 46. Specifically, the spread angle and the radius of the detection range 44 are considerably larger than the spread angle and the radius of the detection range 46. In the first example, the detection range 44 can be considered as an enlarged detection range for detecting both a nearby person and a passerby, and the detection range 46 can be considered as a limited detection range for detecting only a nearby person. In the case of the transition without paper, the detection ranges 44 and 46 function stepwise, and in the case of the transition with paper, only the detection range 44 functions.

In FIG. 3, a reference numeral 48 indicates a moving path of a nearby person. A plurality of ellipses 48A are drawn on the moving path 48, and represent the direction and the moving speed of the nearby person. Reference numeral 50 indicates a moving path of the passerby. A plurality of ellipses 50A are drawn on the moving path trajectory 50, and represent the direction and the moving speed of the passerby.

In a normal operating state, power is supplied to both the first human sensor and the second human sensor. Actually, the output signal of the second human sensor is constantly referred to, and it is determined whether or not a user is present near the front side of the main body 11 based on the output signal. In a case where a user is near the front side of the main body 11, automatic transition to the sleep state is limited.

In the first example, the operations of the first human sensor and the second human sensor in the sleep state differ depending on whether there is transition without paper or transition with paper. As will be described in detail later, in the case of the transition without paper, in the sleep state, first, the first human sensor is in the operating state, and the second human sensor is in the stop state. In such a situation, in a case where a person enters the detection range 44 of the first human sensor, that is, in a case where it is determined that a human has been detected based on the output signal of the first human sensor, the operation of the second human sensor is started, with the detection as a trigger. Thereafter, in a case where a person enters the detection range 46 of the second human sensor, that is, in a case where it is determined that a person has been detected based on the output signal of the second sensor, the return control is started.

On the other hand, in the case of the transition with paper, in the sleep state, the first human sensor is in the operating state, and the second human sensor is in the stop state. In such a situation, in a case where a person enters the detection range 44 of the first human sensor, that is, in a case where it is determined that a human has been detected based on the output signal of the first human sensor, the return control is started, only due to the event. In the case of the transition with paper, in the sleep state, the second human sensor does not function.

Figure 4:
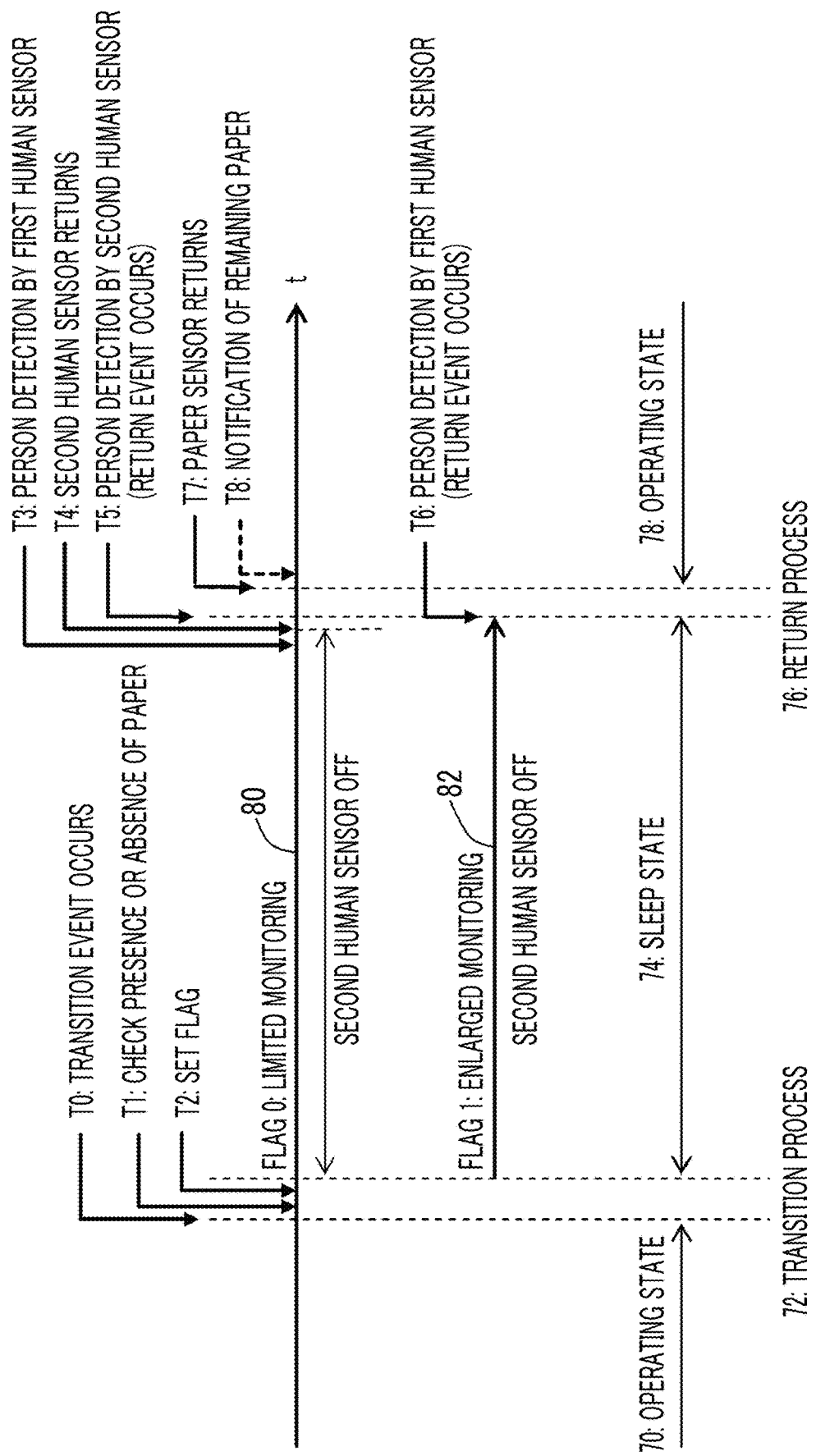
FIG. 4 is a timing chart illustrating an operation sequence.

FIG. 4 is a timing chart illustrating an operation sequence in the first example. FIG. 4 illustrates the control contents of the above-described monitoring control section, state control section, light emission control section, or the like. The horizontal axis is the time axis.

In the operating state 70, in a case where a transition event occurs at the timing T0, the state changes to the sleep state 74 through the transition process 72. Examples of the transition event include an operation of a power saving button, elapse of a predetermined time after execution of a final job, or the like. In the transition process 72, at timing T2, the presence or absence of paper on the two paper trays in the cavity is checked. At that time, output signals of two paper sensors provided on two paper trays are referred to. In a case where there is no paper on any of the paper trays, 0 is set as the flag at timing T2. In a case where there is a paper on any of the paper trays, 1 is set as the flag at timing T2.

As indicated by reference numeral 80, in a case where the flag 0 is set, limited monitoring is performed. Specifically, first, the operation of the second human sensor is stopped, and only the first human sensor operates. In a case where a person is detected by the first human sensor (specifically, in a case where it is determined that either a passerby or a nearby person has been detected) at timing T3, the operation of the second human sensor is restarted at timing T4. Thereafter, in a case where a person is detected by the second human sensor at timing T5 (specifically, in a case where it is determined that a nearby person has been detected), the state returns to the operating state 78 via a return process 76. The detection of a person causing the return is considered as a return event. Note that in a case where a person has been detected by the first human sensor and the case where no person is detected by the second human sensor within a predetermined time thereafter (specifically, in a case where a passerby is detected but no nearby person is detected), the state returns to the monitoring state using only the first human sensor.

On the other hand, as indicated by reference numeral 82, in a case where the flag 1 is set, enlarged monitoring is performed. Specifically, the operation of the second human sensor is stopped, and only the first human sensor operates. In a case where a person is detected by the first human sensor at timing T6 (specifically, in a case where it is determined that either a passerby or a nearby person has been detected), the image forming apparatus returns to the operating state 78 via a return process 76. As in the above case, the detection of a person causing the return is considered as a return event. At a timing T7 corresponding to the time of return, the operations of the two paper sensors provided on the two discharge trays in the cavity are restored. At this time, in a case where a paper is detected by any of the paper sensors, the light emitter is turned on, that is, to notify of the paper remaining.

As described above, in the case of the transition without paper, the image forming apparatus returns only in a case where the nearby person is detected. At the time of the return, the light emitter is not normally turned on because there is no paper on the two discharge trays. In a case where the paper is discharged onto any of the paper trays after the return, the light emitter is turned on. On the other hand, in the case of the transition with paper, the image forming apparatus returns even in a case where there are not only a nearby person but also a passerby. At the time of return, usually, the paper remains, so that the user is notified of this situation by the light emission of the light emitter. Not only the nearby person but also the passerby may be notified of the paper remaining. Thus, the paperwork for the paper can be prompted. Note that in the case of the transition with paper, in a case where the paper does not remain when returning, that is, in a case where the remaining paper is removed without causing return in the sleep state, notification is not performed.

A sound may be output from the speaker instead of or together with the light emission. The notification may be performed by displaying a message on the display device. In a case of performing notification by the light emitter, blinking may be employed instead of continuous lighting. Note that in the sleep state, also in the case of the transition without paper, similarly to the case of the transition with paper, only the first human sensor is operated, and it is considered that the apparatus returns immediately at the time a person is detected by the first human sensor, but in this case, the image forming apparatus may be returned unnecessarily only due to the presence of a passerby, resulting in a situation contrary to power saving. In the exemplary embodiment, the image forming apparatus returns only in a case where the return is necessary. This achieves both the notification of the paper remaining and the power saving.

In the above-described exemplary embodiment, the paper remaining is managed for the two discharge trays in the cavity, but the paper remaining may be managed for another mounting surface, for example, another discharge tray, a document tray (including a platen), or the like.

Figure 5:
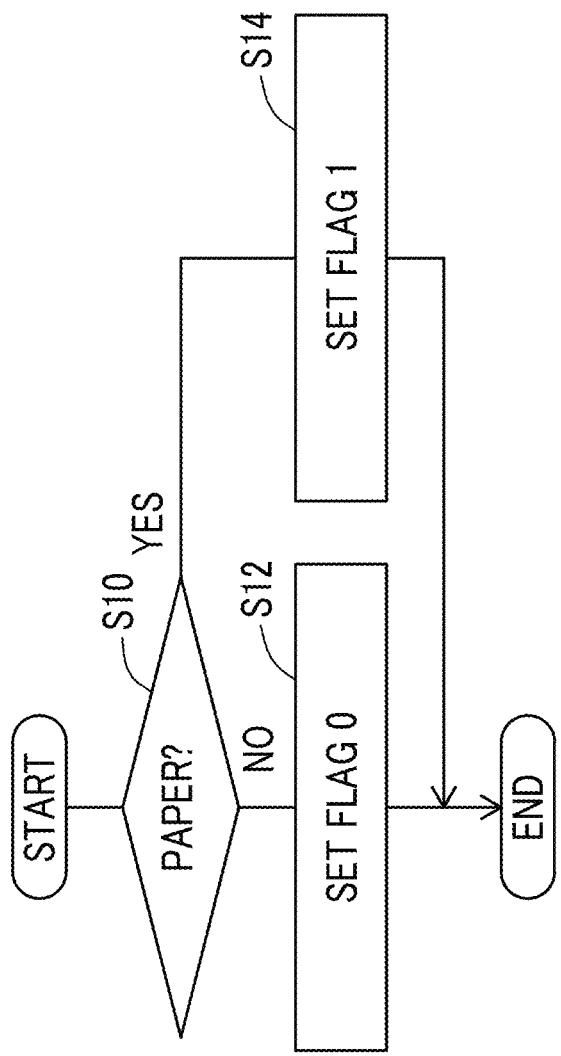
FIG. 5 is a flowchart illustrating an operation in a case of transition to a sleep state.

FIG. 5 illustrates the operation at the time of transition as a flowchart. The contents indicate the contents of the control of the processor. This also applies to FIGS. 6, 7, 11, and 14 described later. Note that the operation at the time of transition is common to each example.

In S10, the output signals of the two paper sensors in the cavity are referred to, and the presence or absence of a paper is determined. In the case where there is no paper, that is, in the case of the transition without paper, the flag is set to 0 in S12. In the case where there is a paper, that is, in the case of the transition with paper, the flag is set to 1 in S14.

Figure 6:
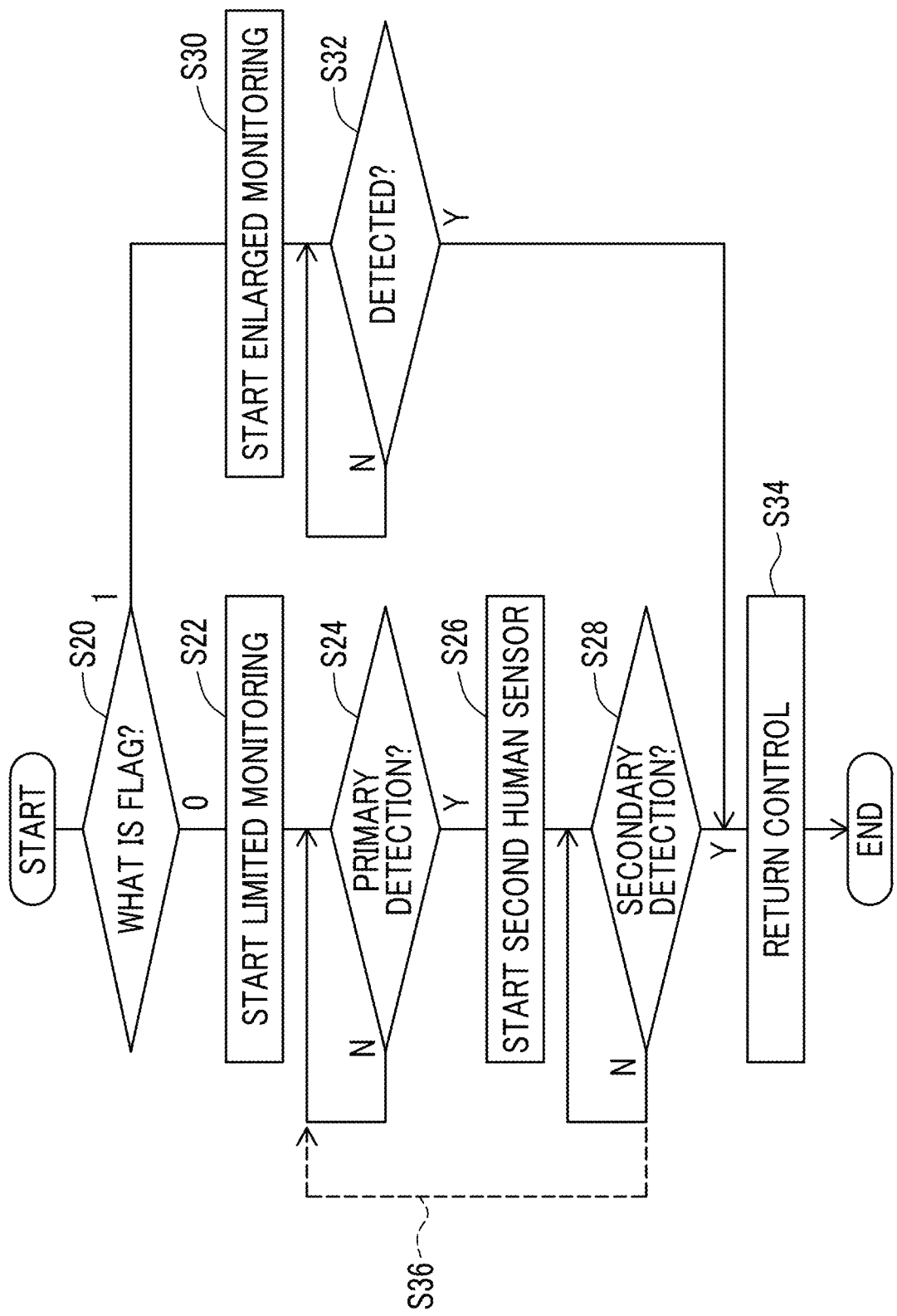
FIG. 6 is a flowchart illustrating a first example.

FIG. 6 illustrates the operation according to the first example as a flowchart. In a case where it is determined in S20 that the flag is 0, limited monitoring is started in S22. That is, only a nearby person is a detection target that causes a return. In S24, it is determined whether or not a person (specifically, either a nearby person or a passerby) has been detected, based on the output signal of the first human sensor. The first detection of a person is referred to as primary detection for convenience. In a case where the primary detection is determined, the operation of the second human sensor is restarted in S26, and it is determined in S28 whether or not a person (specifically, a nearby person) is detected based on the detection signal of the second human sensor. This second detection is referred to as secondary detection for convenience. In a case where the secondary detection is determined, control of returning to the operating state is performed in S34. After the primary detection, in a case where the secondary detection is not determined within a predetermined time, the process returns to the stage of determining the presence or absence of the primary detection as illustrated in S36.

On the other hand, in a case where it is determined in S20 that the flag is 1, it is determined in S30 whether or not a person (specifically, either a nearby person or a passerby) is detected, based on the output signal of the first human sensor. The detection of a person at that stage corresponds to the primary detection. However, in a case where the flag is 1, a determination as to the presence or absence of secondary detection is performed. In a case where the result of the determination in S32 is Yes, S34 is executed.

As described above, in the first example, the detection target is switched by switching the main sensor that detects a person, in other words, by switching the main detection range for detecting a person. From such a viewpoint, the first human sensor is an enlarged human sensor, and the second human sensor is a limited human sensor.

Even in the second to fifth examples described below, similarly to the first example, in the case of the transition without paper, that is, in a case where the flag is 0, the limited monitoring is performed in the sleep state and only the nearby person is a detection target, and in the case of the transition with paper, that is, in the case where the flag is 1, the enlarged monitoring is performed in the sleep state, and a nearby person and a passerby are detection targets. However, in the first to fifth examples, methods of changing the detection target are different from each other.

Figure 7:
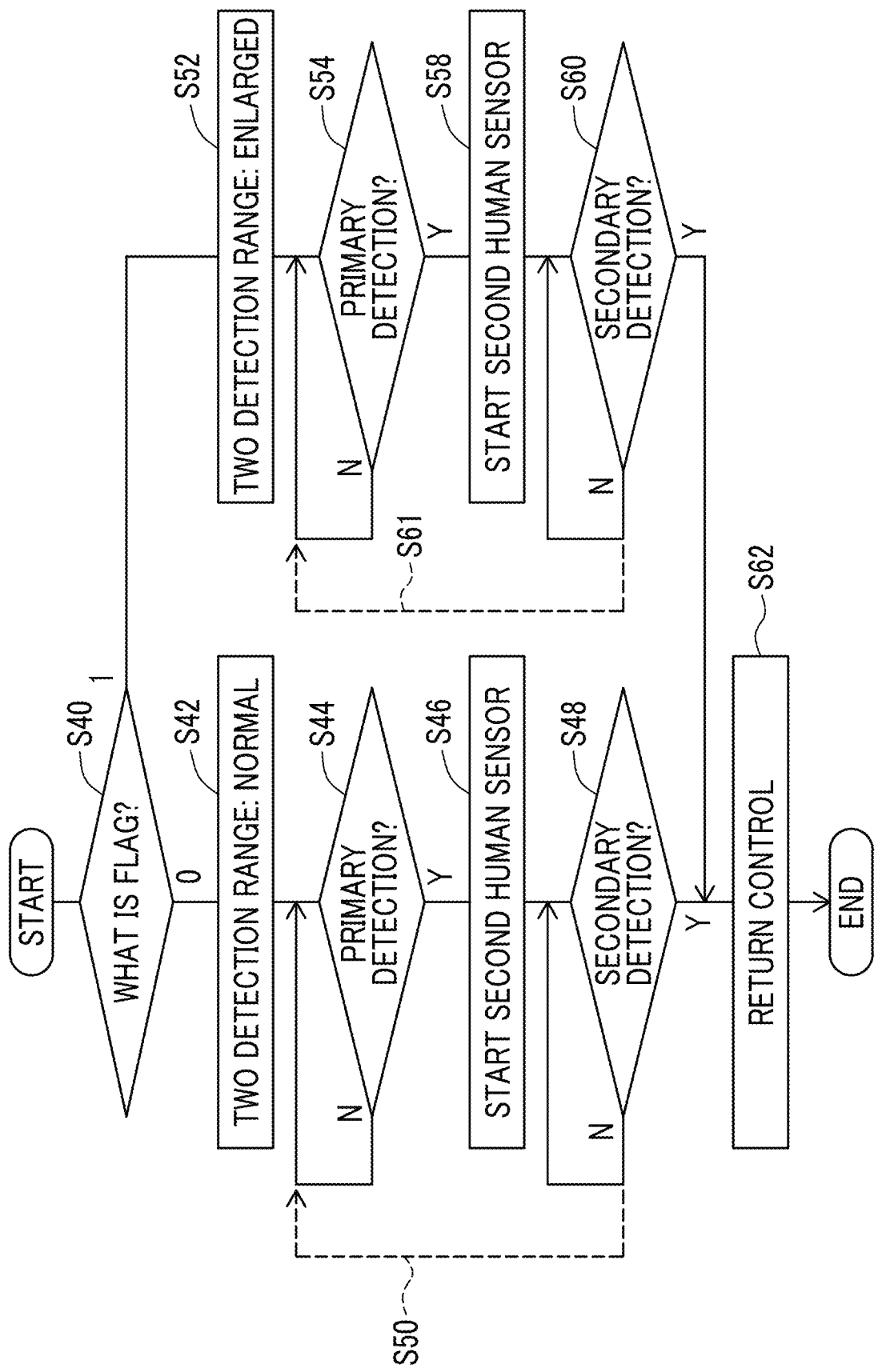
FIG. 7 is a flowchart illustrating a second example.

FIG. 7 illustrates the operation according to the second example as a flowchart. In the second example, on the assumption of the configuration illustrated in FIGS. 1 and 2, two-stage detection is performed even in a case where the flag is 1, in the sleep state. As described below, the detection target is changed by switching the size of the main detection range.

Specifically, in a case where it is determined in S40 that the flag is 0, the normal detection range is set as the detection range of the first sensor in S42, and the normal detection range is set as the detection range of the second sensor. For example, the two detection ranges 44 and 46 illustrated in FIG. 1 are set. In a case where two normal detection ranges have already been set, the step of S42 is skipped. Subsequently, the presence or absence of primary detection is determined in S44, the second human sensor operates in S46, and the presence or absence of secondary detection is determined in S48. In S62, the return control is executed. S42 to S48 are the same as S22 to S28 illustrated in FIG. 6. After the primary detection, in a case where a predetermined time has elapsed, the process proceeds to S44 as illustrated in S50.

On the other hand, in FIG. 7, in a case where it is determined in S40 that the flag is 1, a detection range that is larger than the normal detection range is set as the detection range of the first human sensor in S52, and a detection range that is larger than the normal detection range is set as the detection range of the second human sensor. In S54, the presence or absence of the primary detection is determined. The operation of the second human sensor is started in S58, and the presence or absence of the secondary detection is determined in S60. In a case where the secondary detection is determined, the return control is executed in S62. After the primary detection, in a case where a predetermined time has elapsed, the process proceeds to S54 as illustrated in S61.

As described above, in the second example, the detection target is changed by changing the sizes of the two detection ranges while maintaining the two-stage detection. From such a viewpoint, the first human sensor is a primary human sensor, and the second human sensor is a secondary human sensor.

Figure 8:
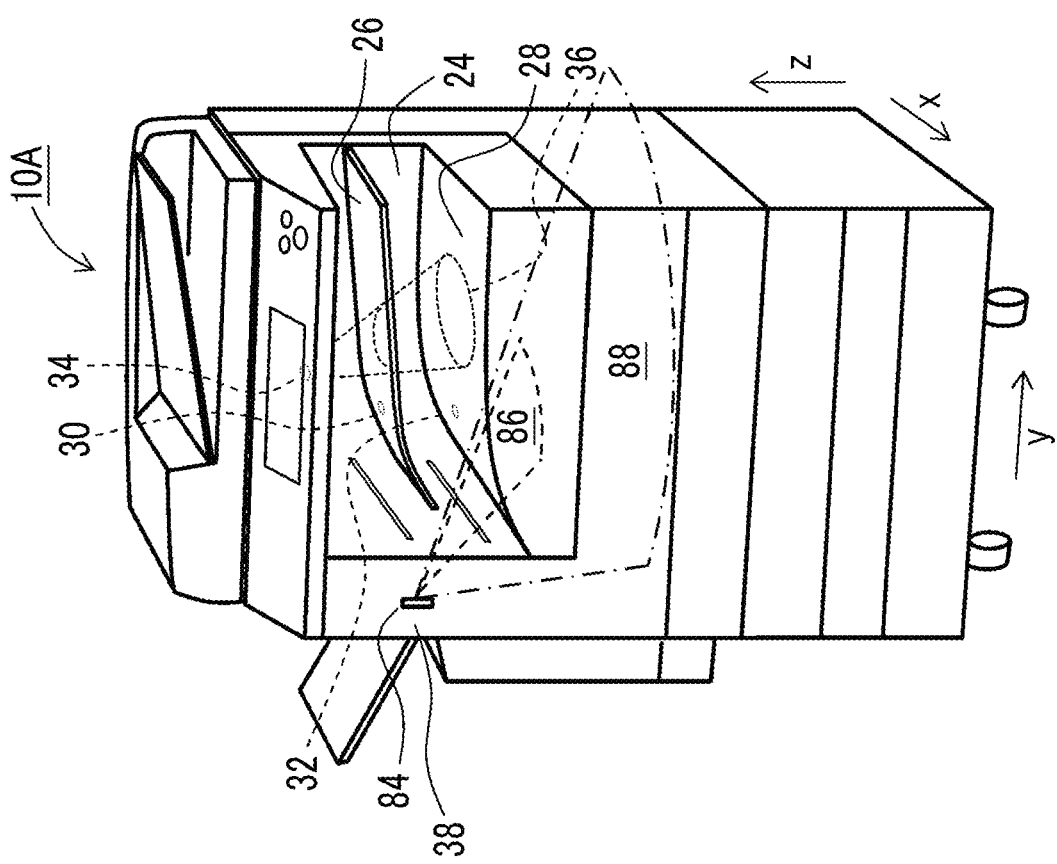
FIG. 8 is a perspective view illustrating another configuration example (third example) of the image forming apparatus according to the exemplary embodiment.

FIG. 8 illustrates another configuration example of an image forming apparatus according to an exemplary embodiment. FIG. 8 illustrates a third example. The difference from the configuration illustrated in FIG. 1 is the configuration of the person detection section. In FIG. 8, the same elements as the elements illustrated in FIG. 1 are denoted by the same reference numerals, and a description thereof will be omitted.

In the image processing apparatus 10A illustrated in FIG. 8, one human sensor 84 is provided in the pillar portion 38. This human sensor 84 corresponds to the second human sensor illustrated in FIG. 1. However, the detection range is changed according to the detection target. Specifically, in the limited monitoring performed in a case where the flag is 0, a limited detection range 86 that is relatively small is set, and a nearby person is detected based on the limited detection range 86. In the enlarged monitoring performed in a case where the flag is 1, an enlarged detection range 88 that is relatively large is set, and a nearby person and a passerby are detected based on the enlarged detection range 88.

In the case of the transition with paper, in a case where a passerby is detected, the image forming apparatus returns to the operating state. At that time, in a case where there is a paper in at least one of the discharge tray 26 or the discharge tray 28, and at least one of the paper sensors 30 and 32 detects the paper, due to the presence of paper, the light emitter 34 is turned on, and the passerby is notified of the paper remaining.

Figure 9:
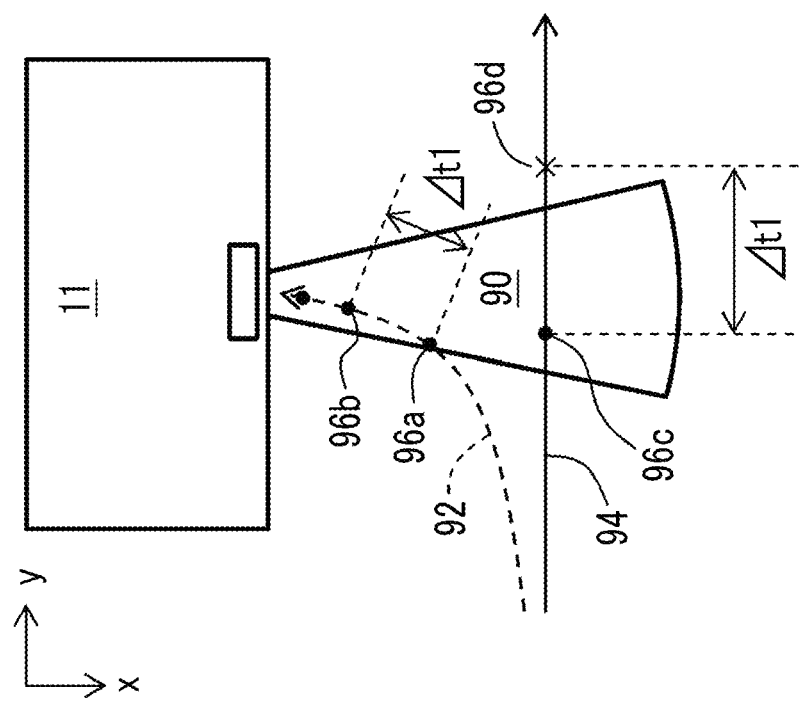
FIG. 9 is a schematic diagram illustrating detection of a passerby and a nearby person in a fourth example.
Figure 10:
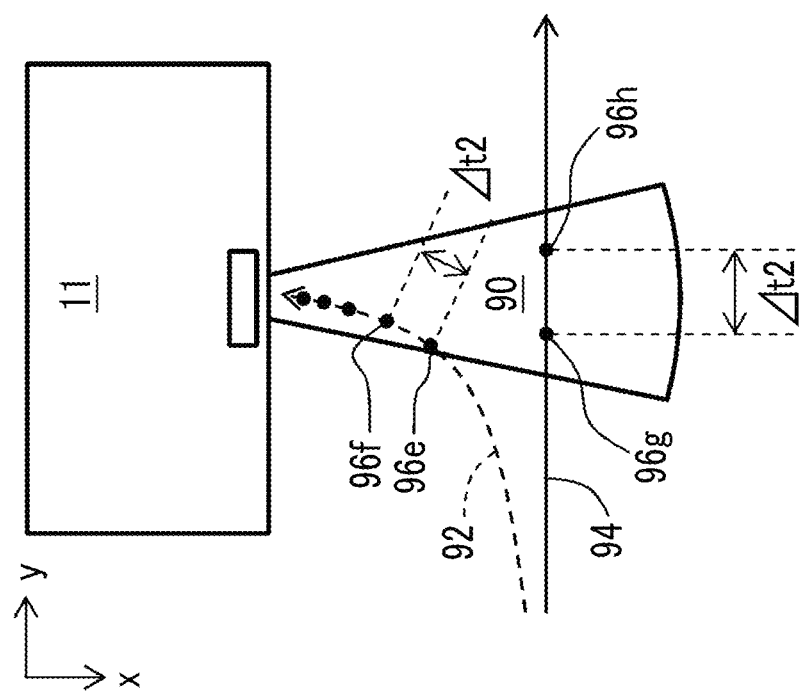
FIG. 10 is a schematic diagram illustrating detection of a passerby and a nearby person in the fourth example.

FIGS. 9 and 10 illustrate a fourth example. FIG. 9 illustrates limited monitoring, and FIG. 10 illustrates enlarged monitoring. In FIGS. 9 and 10, the detection range 90 of the human sensor is set in the front of the main body 11. In the illustrated example, the detection range 90 has a form that spreads in a fan shape forward from the center position of the main body 11 in the y direction. The same detection range 90 is set for the limited monitoring and the enlarged monitoring.

Reference numeral 92 indicates a moving path of a nearby person, and reference numeral 94 indicates a moving path of a passerby. The sampling cycle for the signal output from the human sensor is $\Delta t1$ in the case of the limited monitoring illustrated in FIG. 9, and $\Delta t2$ in the case of the enlarged monitoring illustrated in FIG. 10. A detection value sampled at each sampling cycle is obtained. A detection value sequence including a plurality of detection values is formed on the time axis.

In the fourth example, the person detection is determined in a case where i detection values equal to or greater than a predetermined threshold are continuously obtained. Such a determination condition is considered as a first determination condition on the assumption of the sampling cycle $\Delta t1$, and is considered as a second determination condition on the assumption of the sampling cycle $\Delta t2$. Note that i is 2 in the illustrated example.

In the limited monitoring illustrated in FIG. 9, two detection values 96*a* and 96*b* exceeding a predetermined threshold are continuously acquired within the detection range 90 by sampling for the nearby person, and at the time of acquisition of the latter detection value 96*b*, it is determined that a person (specifically, a nearby person) has been detected. A detection value exceeding a predetermined threshold is a person detection value. As for the passerby, in the illustrated example, the detection value exceeding the predetermined threshold is only the detection value 96*c*. That is, passersby are excluded from detection targets. Incidentally, reference numeral 96*d* indicates a virtual detection value exceeding a predetermined threshold which may be obtained in a case where the detection range 90 has been considerably expanded.

On the other hand, in the enlarged monitoring illustrated in FIG. 10, two detection values 96*e* and 96*f* exceeding a predetermined threshold are obtained for a nearby person shortly after entering the detection range 90, and at the time the detection value 96*f* is obtained, it is determined that a person (specifically, a nearby person) has been detected. As for the passerby, two detection values 96*g* and 96*h* exceeding a predetermined threshold are obtained within the detection range 90, and it is determined that a person (specifically, a passerby) is detected at the time the latter detection value 96*h* is detected.

As described above, the form and size of the detection range are appropriately determined on the assumption of the general moving paths of the nearby person and the passerby, and in a case where the sampling cycle is changed on the assumption of the general moving paths, the detection target can be changed.

Figure 11:
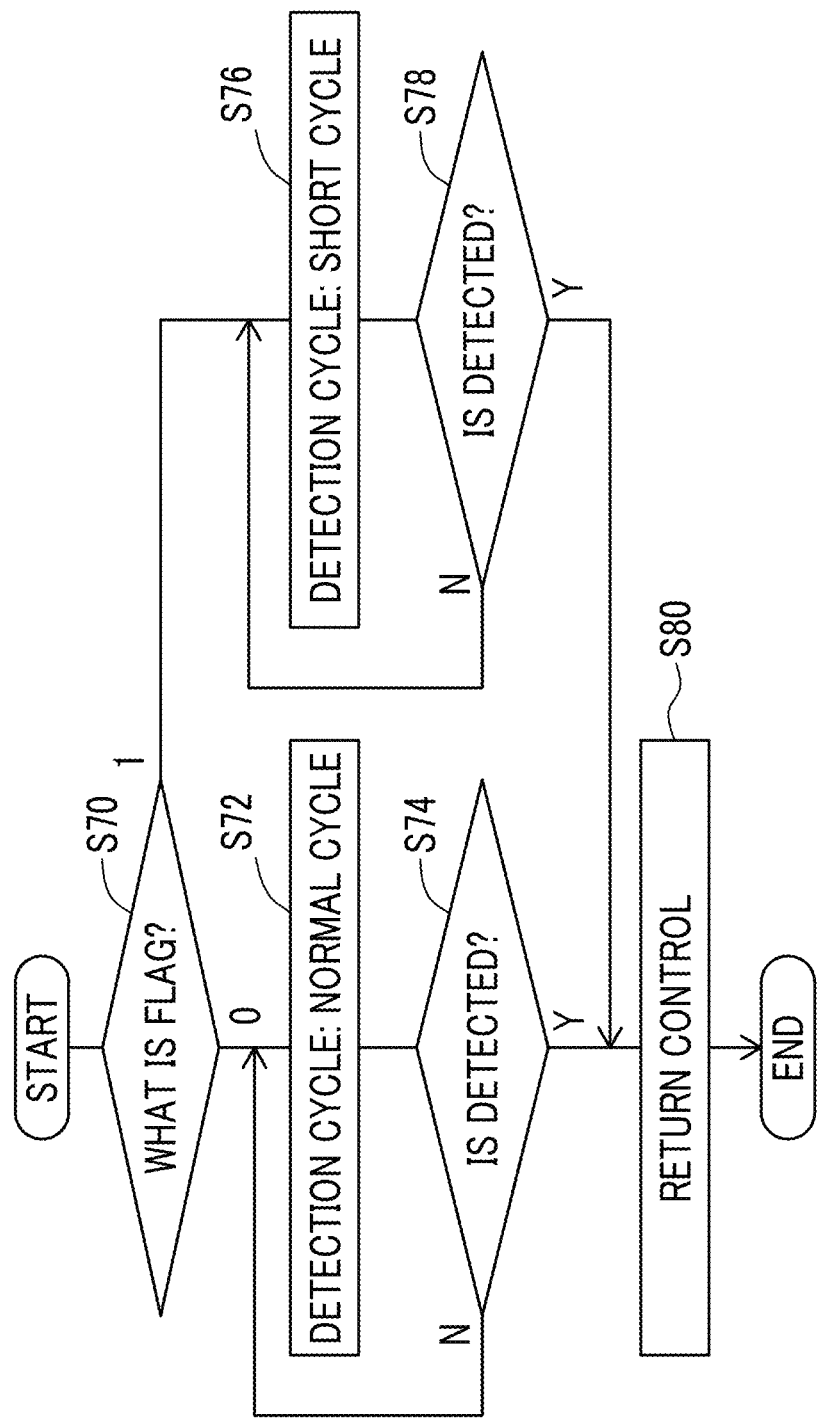
FIG. 11 is a flowchart illustrating the fourth example.

FIG. 11 illustrates the operation according to the fourth example as a flowchart. In a case where it is determined in S70 that the flag is 0, the normal cycle is set as the sampling cycle (in other words, the detection cycle) in S72. In S74, a plurality of detection values arranged on the time axis are referred to under the set sampling cycle, and in a case where two detection values exceeding a predetermined threshold are continuously obtained, it is determined that a person (specifically, a nearby person) has been detected. In S80, the return control is executed.

On the other hand, in a case where it is determined in S70 that the flag is 1, a short cycle is set as the sampling cycle in S76. This makes it easier to perform person detection than in the case of a normal cycle. In other words, the determination conditions are relaxed. In S78, a plurality of detection values arranged on the time axis are referred to under the set sampling cycle, and in a case where two detection values exceeding a predetermined threshold are continuously obtained, it is determined that a person (specifically, either a nearby person or a passerby) has been detected. Thus, the presence or absence of a person is determined.

Figure 12:
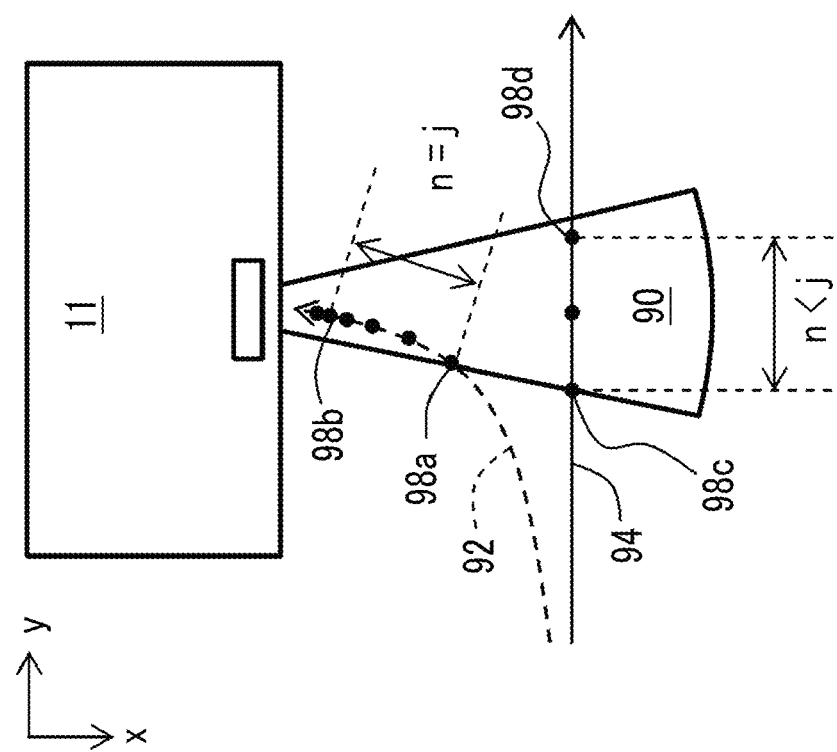
FIG. 12 is a schematic diagram illustrating detection of a passerby and a nearby person in a fifth example.
Figure 13:
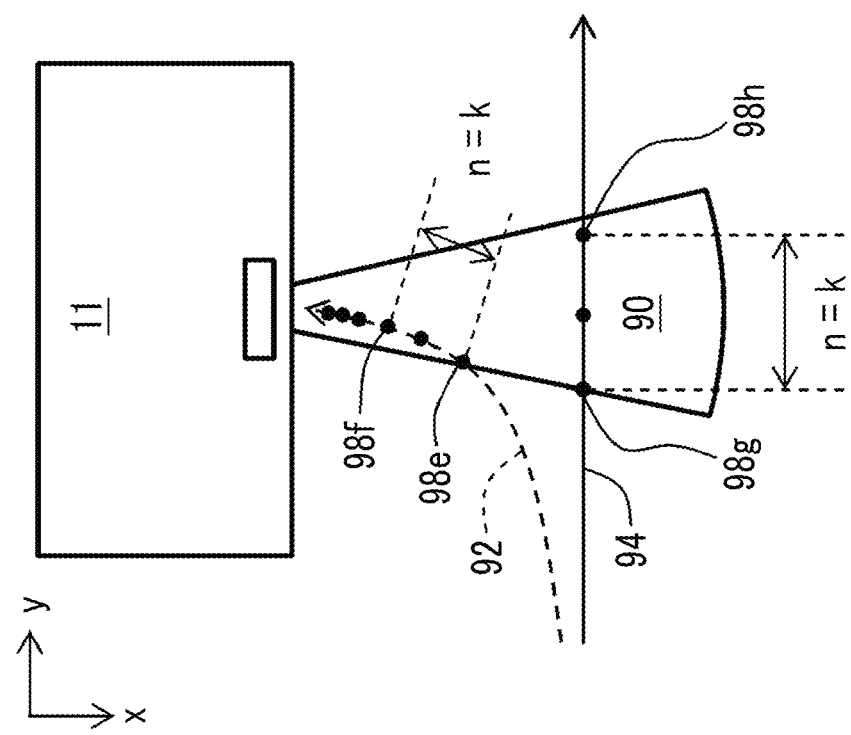
FIG. 13 is a schematic diagram illustrating detection of a passerby and a nearby person in the fifth example.

FIGS. 12 and 13 illustrate a fifth example. FIG. 12 illustrates limited monitoring, and FIG. 13 illustrates enlarged monitoring. In FIGS. 12 and 13, the same detection range 90 of the human sensor is set in the front of the main body 11. The moving path of the nearby person is indicated by reference numeral 92, and the moving path of the passerby is indicated by reference numeral 94.

In the fifth example, the continuous number n of detection values exceeding a predetermined threshold is counted, and in a case where the continuous number reaches a predetermined number (j in the case of limited monitoring and k in the case of enlarged monitoring), the person detection is determined. In the illustrated example, j is 5 and k is 3. Note that j>k.

In the limited monitoring illustrated in FIG. 12, for a nearby person, it is determined that a person (specifically, a nearby person) has been detected at a time the continuous number n of detection values exceeding a predetermined threshold reaches a predetermined number j (see reference numerals 98*a* and 98*b*). Although a plurality of detection values are obtained within the detection range 90 for the passerby (see reference numerals 98*c* and 98*d*), the continuous number n does not reach the predetermined number j, and the passerby is regarded as a detection target.

In the enlarged monitoring illustrated in FIG. 13, as for the nearby person, the continuous number n of the detection values exceeding the predetermined threshold has reached the predetermined number k as soon as possible, and at the time of arrival, it is determined that a person (that is, a nearby person) has been detected. As for the passerby, the continuous number n of the detection values exceeding the predetermined threshold in the detection range 90 has reached the predetermined number k, and at the time of arrival, it is determined that a person (that is, either a nearby person or a passerby) has been detected.

Figure 14:
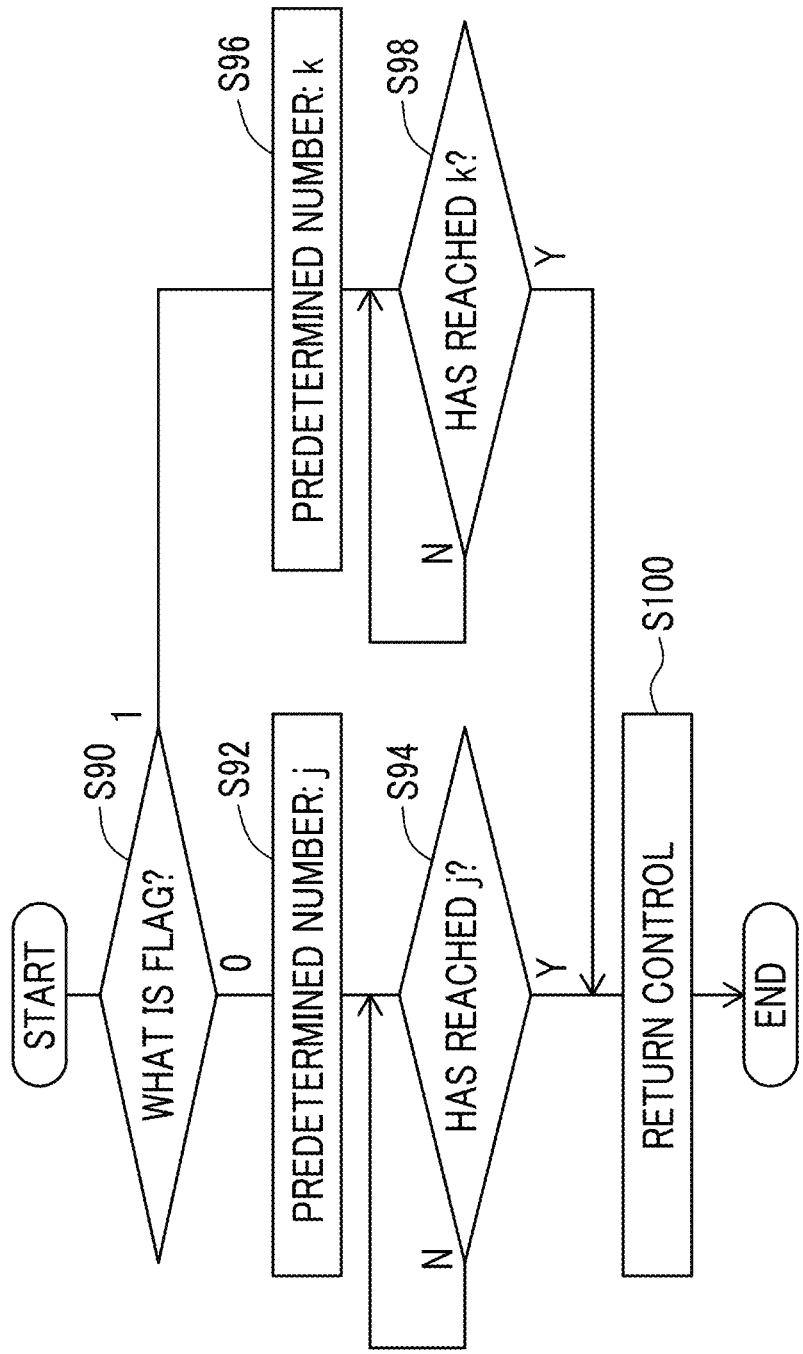
FIG. 14 is a flowchart illustrating the fifth example.

FIG. 14 illustrates the operation according to the fifth example as a flowchart. In a case where it is determined in S90 that the flag is 0, limited monitoring is performed, and a predetermined number j is set in S92. In S94, it is determined whether or not the continuous number n of the detection values exceeding the predetermined threshold has reached the predetermined number j. In a case where the continuous number n reaches the predetermined number j, it is determined that a person (specifically, a nearby person) has been detected. In S100, the return control is executed.

On the other hand, in a case where it is determined in S90 that the flag is 1, enlarged monitoring is performed, and a predetermined number k is set in S96. As described above, k<j. That is, in the enlarged monitoring, a determination condition that is more easily satisfied is set as compared with the limited monitoring. In other words, the relaxed determination conditions are set. In S98, it is determined whether or not the continuous number n of the detection values exceeding the predetermined threshold has reached the predetermined number k. In a case where the continuous number n reaches the predetermined number k, it is determined that a person (specifically, either a nearby person or a passerby) has been detected. Thereafter, S100 is executed. Note that, in a case where the detection value falls below a predetermined threshold in the count of the continuous number n, the continuous number n is reset.

Note that a combination of the plurality of examples described above may be employed. For example, the change of the sampling cycle and the change of a predetermined number to be compared with the continuous number may be performed simultaneously.

Figure 15:
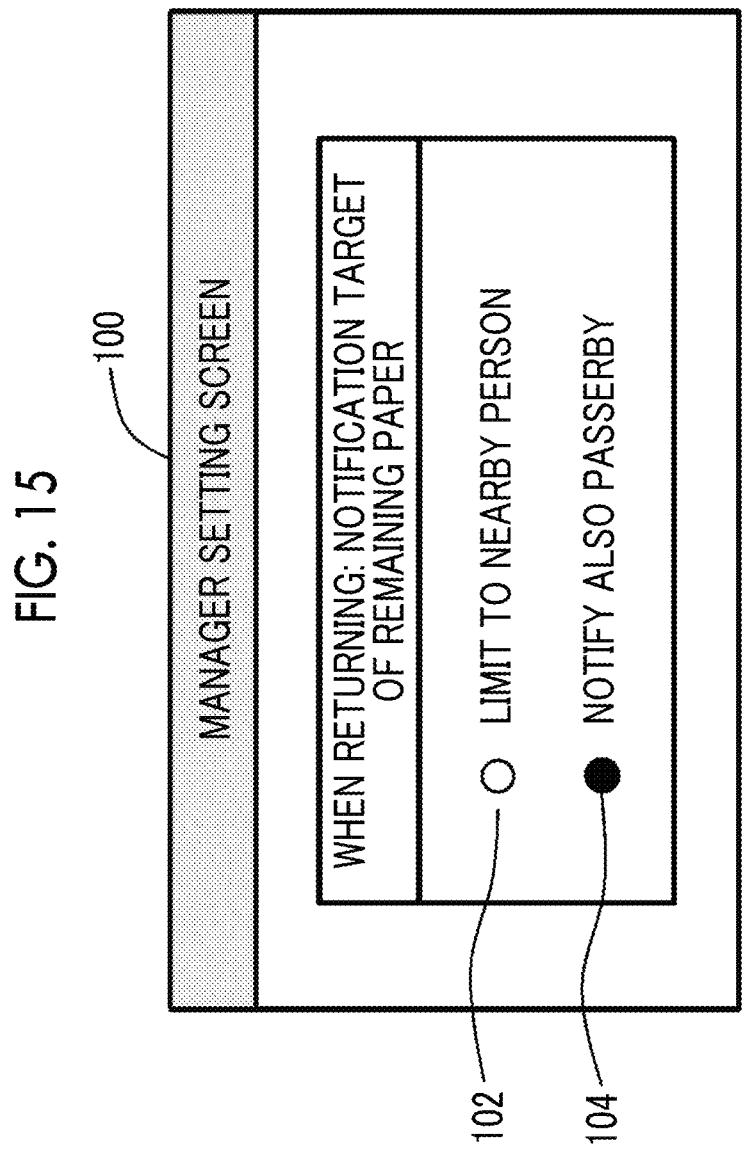
FIG. 15 is a diagram for explaining selection of a notification target.

FIG. 15 illustrates a screen 100 displayed when the operation mode is selected. The illustrated screen 100 includes a window for selecting a notification target of the paper remaining when returning. In the window, a button 102 operated in a case of selecting a limited notification mode for limiting the notification target to a nearby person, and a button 104 operated in a case of selecting an enlarged notification mode for expanding the notification target to passersby are included. In the limited notification mode, in the sleep state, a nearby person is a detection target, and a passerby is excluded from the detection target. In the enlarged notification mode, both a nearby person and a passerby are detection targets in the sleep state.

FIG. 16 illustrates a plurality of light emission modes (that is, a plurality of light emission modes) on the assumption that two discharge trays are provided in a cavity formed in the main body. Two paper sensors (specifically, an upper paper sensor and a lower paper sensor) are provided for the two discharge trays. Since the presence or absence of a paper is detected by the individual paper sensors, four combinations may be obtained as modes in which the two paper sensors perform detection. Among the four combinations, three combinations correspond to three remaining modes.

In the light emission mode A, the light emitter is turned on in a case where any of the paper sensors detects a paper. In the light emission mode B, lighting or blinking is selected according to the number of sensors that are detecting a paper. In a case where only one paper sensor is detecting a paper, the blinking cycle indicates which paper sensor is detecting a paper. In the light emission mode C, the combination is expressed by changing the light emission color. The light emission mode D is a mode selected in a case where the notification about the paper is performed only for the lower discharge tray. The light emission mode E is a mode selected in a case where the notification about the paper is performed only for the upper discharge tray. One of the light emission modes is selected by the user. Alternatively, one of the light emission modes is automatically selected according to the situation.

In the embodiments above, the term "processor" refers to hardware in a broad sense. Examples of the processor include general processors (e.g., CPU: Central Processing Unit), and dedicated processors (e.g., GPU: Graphics Processing Unit, ASIC: Application Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
a plurality of mounting surfaces provided on a main body of the image forming apparatus and on which discharged paper is placed after image formation;
a human sensor provided in the main body;
a plurality of paper sensors provided on the plurality of mounting surfaces, wherein power supply to each of the plurality of paper sensors is stopped in a sleep state of the main body;
a processor configured to:
control a transition to the sleep state of the main body based on an occurrence of a transition event;
control return from the sleep state of the main body, based on the detection of a person by the human sensor;
determine whether a state of the plurality of mounting surfaces is a paper-absence state or a paper-presence state according to output signals of the plurality of paper sensors in the transition to the sleep state after the occurrence of the transition event, wherein the paper-absence state is a state where there is no paper on the plurality of mounting surfaces, the paper-presence state is a state where there is a paper on the plurality of mounting surfaces;
perform control such that
in a case of the state being the paper-presence state in the transition to the sleep state, a nearby person approaching the main body is included in a detection target of the human sensor in the sleep state, and a passerby passing near the main body is not included in the detection target in the sleep state, and
in a case of the state being the paper-absence state in the transition to the sleep state, the nearby person and the passerby are included in the detection target in the sleep state; and
control notification of paper remaining in a case where there is a paper on the plurality of mounting surfaces after the return from the sleep state.

2. The image forming apparatus according to claim 1,
wherein in a case of the state being the paper-absence state in the transition to the sleep state, a detection range of the human sensor is set to a limited detection range for including the nearby person in the detection target and excluding the passerby from the detection target in the sleep state,
wherein in a case of the state being the paper-presence state in the transition to the sleep state, a detection range of the human sensor is set to an enlarged detection range for including the nearby person and the passerby in the detection target in the sleep state, and
wherein the enlarged detection range is larger than the limited detection range.

3. The image forming apparatus according to claim 2,
wherein the human sensor includes
a limited human sensor having the limited detection range, and
an enlarged human sensor having the enlarged detection range, wherein in a case where of the state being the paper-absence state in the transition to the sleep state, the person is detected based on an output of the limited human sensor in the sleep state, and wherein in a case of the state being the paper-presence state in the transition to the sleep state, the person is detected based on output of the enlarged human sensor in the sleep state.

4. The image forming apparatus according to claim 2, wherein the human sensor includes
   a primary human sensor, and
   a secondary human sensor activated based on an output of the primary human sensor,
wherein in a case of the state being the paper-absence state in the transition to the sleep state, a detection range of the secondary human sensor is set to the limited detection range in the sleep state, and
wherein in a case of the state being the paper-presence state in the transition to the sleep state, a detection range of the secondary human sensor is set to the enlarged detection range in the sleep state.

5. The image forming apparatus according to claim 4, wherein in a case of the state being the paper-absence state in the transition to the sleep state, a detection range of the primary human sensor is set to a first primary detection range in the sleep state, and
wherein in a case of the state being the paper-presence state in the transition to the sleep state, a detection range of the primary human sensor is set to a second primary detection range larger than the first primary detection range in the sleep state.

6. The image forming apparatus according to claim 1, wherein in the case of the state being the paper-absence state in the transition to the sleep state, when an output signal of the human sensor satisfies a first determination condition for including the nearby person in the detection target and excluding the passerby from the detection target in the sleep state, the return is executed,
wherein in the case of the state being the paper-presence state in the transition to the sleep state, when an output signal of the human sensor satisfies a second determination condition for including the nearby person and the passerby in the detection target in the sleep state, the return is executed.

7. The image forming apparatus according to claim 6, wherein both the first determination condition and the second determination condition require that a predetermined i number of person detection values are continuously output as the output signal of the human sensor,
wherein a sampling cycle of the output signal is set to a first period, by applying the first determination condition, and
wherein the sampling cycle of the output signal is set to a second period shorter than the first period, by applying the second determination condition.

8. The image forming apparatus according to claim 6, wherein the first determination condition requires that j person detection values are continuously output as the output signal of the human sensor, and
wherein the second determination condition requires that k person detection values, k being smaller than j, are continuously output as the output signal of the human sensor.

9. The image forming apparatus according to claim 1, wherein the plurality of mounting surfaces are a plurality of discharge trays provided in a cavity of the main body, and
wherein the processor controls to emit light toward the plurality of discharge trays.

10. The image forming apparatus according to claim 9, wherein in a case where there is a paper on at least one of the plurality of discharge trays in the transition to the sleep state the nearby person and the passerby are included in the detection target in the sleep state.

11. The image forming apparatus according to claim 10, wherein the processor switches a light emission mode according to a paper remaining mode in the plurality of discharge trays.

12. The image forming apparatus according to claim 9, wherein in a case where there is a paper on the discharge tray designated from among the plurality of discharge trays in the transition to the sleep state, the nearby person and the passerby are included in the detection target in the sleep state.

13. The image forming apparatus according to claim 1, wherein the processor controls the notification of the paper remaining by using at least one of a light emitter, a display device, or a speaker.

14. A non-transitory computer readable medium storing a program executed in an image forming apparatus, the program comprising:
   controlling a transition to a sleep state of a main body of the image forming apparatus based on an occurrence of a transition event;
   controlling return from the sleep state of the main body, based on detection of a person by a human sensor provided in the main body;
   determining whether a state of a plurality of mounting surfaces provided on the main body of the image forming apparatus and on which discharged paper is placed after image formation is a paper-absence state or a paper-presence state according to output signals of a plurality of paper sensors in the transition to the sleep state after the occurrence of the transition event, wherein power supply to each of the plurality of paper sensors is stopped in the sleep state of the main body, and
   wherein the plurality of wherein the paper-absence state is a state where there is no paper on the plurality of mounting surfaces, the paper-presence state is a state where there is a paper on the plurality of mounting surfaces;
   performing control such that
   in a case of the state being the paper-presence state in the transition to the sleep state, a nearby person approaching the main body is included in a detection target of the human sensor in the sleep state, and a passerby passing near the main body is not included in the detection target in the sleep state, and
   in a case of the state being the paper-absence state in the transition to the sleep state, the nearby person and the passerby are included in the detection target in the sleep state; and
   controlling notification of paper remaining in a case where there is a paper on the plurality of mounting surfaces after the return from the sleep state.

* * * * *